United States Patent [19]

Reyer

[11] 4,003,479

[45] Jan. 18, 1977

[54] HOIST AND TRANSPORTING APPARATUS

[76] Inventor: William J. Reyer, 1312 Polk St., Box 103, Topeka, Kans. 66612

[22] Filed: June 4, 1975

[21] Appl. No.: 583,624

[52] U.S. Cl. .............................. 214/1 D; 214/75 R; 212/8 R

[51] Int. Cl.[2] .............................. B25J 3/00

[58] Field of Search ............... 214/75 R, 75 H, 1 R, 214/650 SG, 1 D; 5/81 R, 83, 84, 86, 87, 89; 212/45, 8 R

[56] References Cited

UNITED STATES PATENTS

| | | | |
|---|---|---|---|
| 209,519 | 10/1878 | Sands | 5/86 |
| 382,872 | 5/1888 | Hardy | 5/87 |
| 2,014,244 | 9/1935 | Bramlett | 5/81 R |
| 2,272,778 | 2/1942 | Reuter | 5/87 R |
| 2,650,725 | 9/1953 | Hoyer et al. | 214/75 H |
| 3,123,224 | 3/1964 | Kral | 5/81 R X |
| 3,172,551 | 3/1965 | Wolfe | 214/75 H |
| 3,262,594 | 7/1966 | Teago | 214/650 SG |
| 3,361,280 | 1/1968 | Traver | 214/650 SG |
| 3,711,877 | 1/1973 | Averill | 5/81 R |
| 3,852,835 | 12/1974 | Whitaker | 5/87 X |

*Primary Examiner*—L. J. Paperner
*Assistant Examiner*—R. B. Johnson
*Attorney, Agent, or Firm*—Fishburn, Gold & Litman

[57] ABSTRACT

A hoist and transporting apparatus for lifting and moving disabled persons, such as paraplegics, polio victims, and the like, as from a bed to a chair. The apparatus has a frame structure with an overhead support deck. A boom carrier is rotatably mounted on the deck and ans a depending arm adjustable in length. One end of a boom is pivotally connected to the lower portion of said support arm. The other end of the boom has a harness member thereon adapted to support a load, such as a person. Power mechanism is connected to the frame and boom carrier and connected to the boom carrier and boom and said power mechanism is remotely controlled, as by the person being moved, to raise and lower the load and rotate the boom carrier.

9 Claims, 4 Drawing Figures

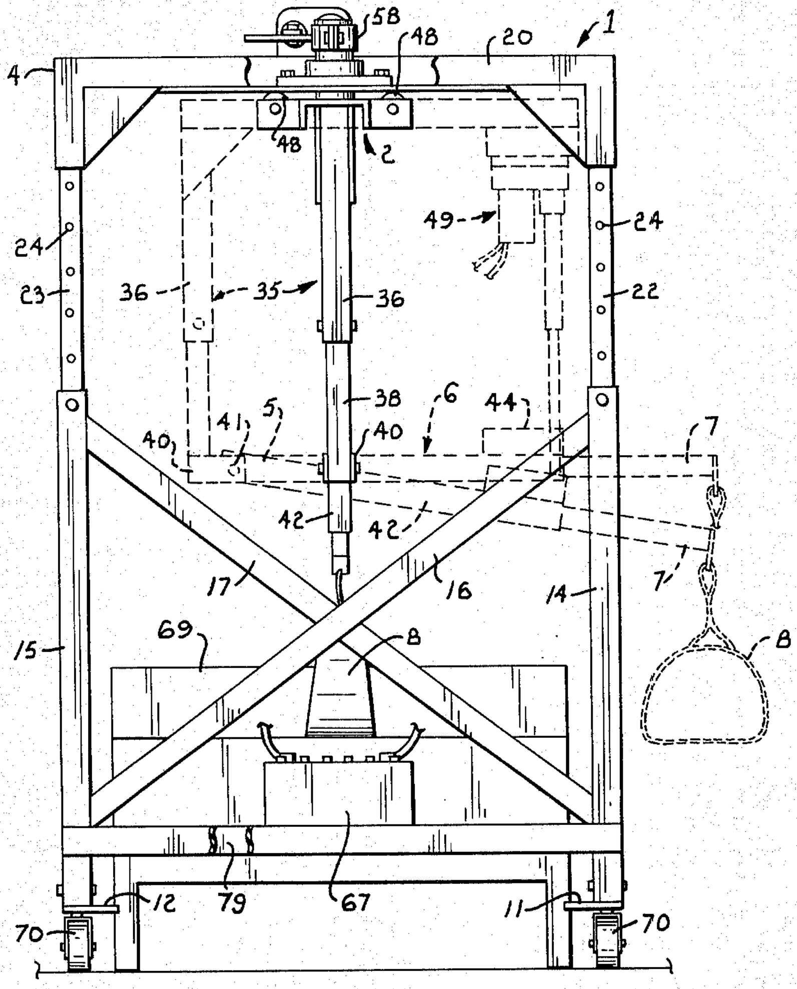
Fig. 3.
Fig. 4.
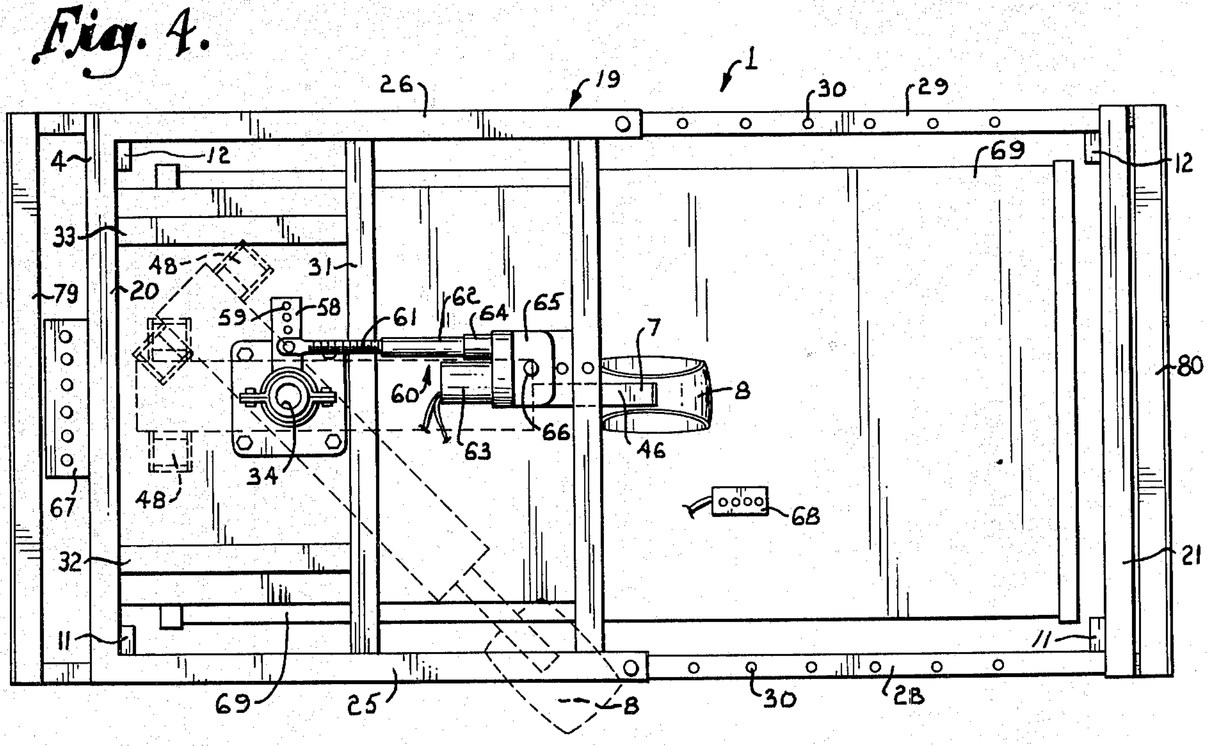

HOIST AND TRANSPORTING APPARATUS

SUMMARY OF THE INVENTION

The present invention relates to maneuvering invalids, disabled persons, and the like, and more particularly to a hoist and transporting apparatus having a boom pivotally mounted on a mounting member which is adapted to be turned to a desired location.

The principal objects of the present invention are: to provide a hoist and transporting apparatus for use by invalids, disabled persons, and the like, for moving into and out of bed, onto and off a toilet seat, into and out of a bath tub, into and out of a wheelchair, and like movements; to provide such a hoist and transporting apparatus adapted to enable disabled persons to be substantially self-sufficient without assistance by attendants, and the like; to provide such a hoist and transporting apparatus wherein the portion thereof supporting the individual has a minimum tendency to swing during movement of the person; to provide such an apparatus including controls operated by the person being moved; to provide such a hoist and transporting apparatus including a battery whereby the person is not stranded by a failure of conventional power supplies; and to provide such a hoist and transporting apparatus which is attractive in appearance, durable in construction, positive in operation, and particularly well adapted for the proposed use.

Other objects and advantages of this invention will become apparent from the following description taken in connection with the accompanying drawings wherein are set forth by way of illustration and example certain embodiments of this invention.

The drawings constitute a part of the specification and include an exemplary embodiment of the present invention and illustrate various objects and features of the hoist and transporting apparatus.

DESCRIPTION OF VIEWS OF THE DRAWINGS

FIG. 3 is an end elevational view of a hoist and transporting apparatus with alternate positions thereof shown in broken lines.

FIG. 4 is a top plan view of the hoist and transporting apparatus with alternate positions thereof shown in broken lines.

Figure 1:
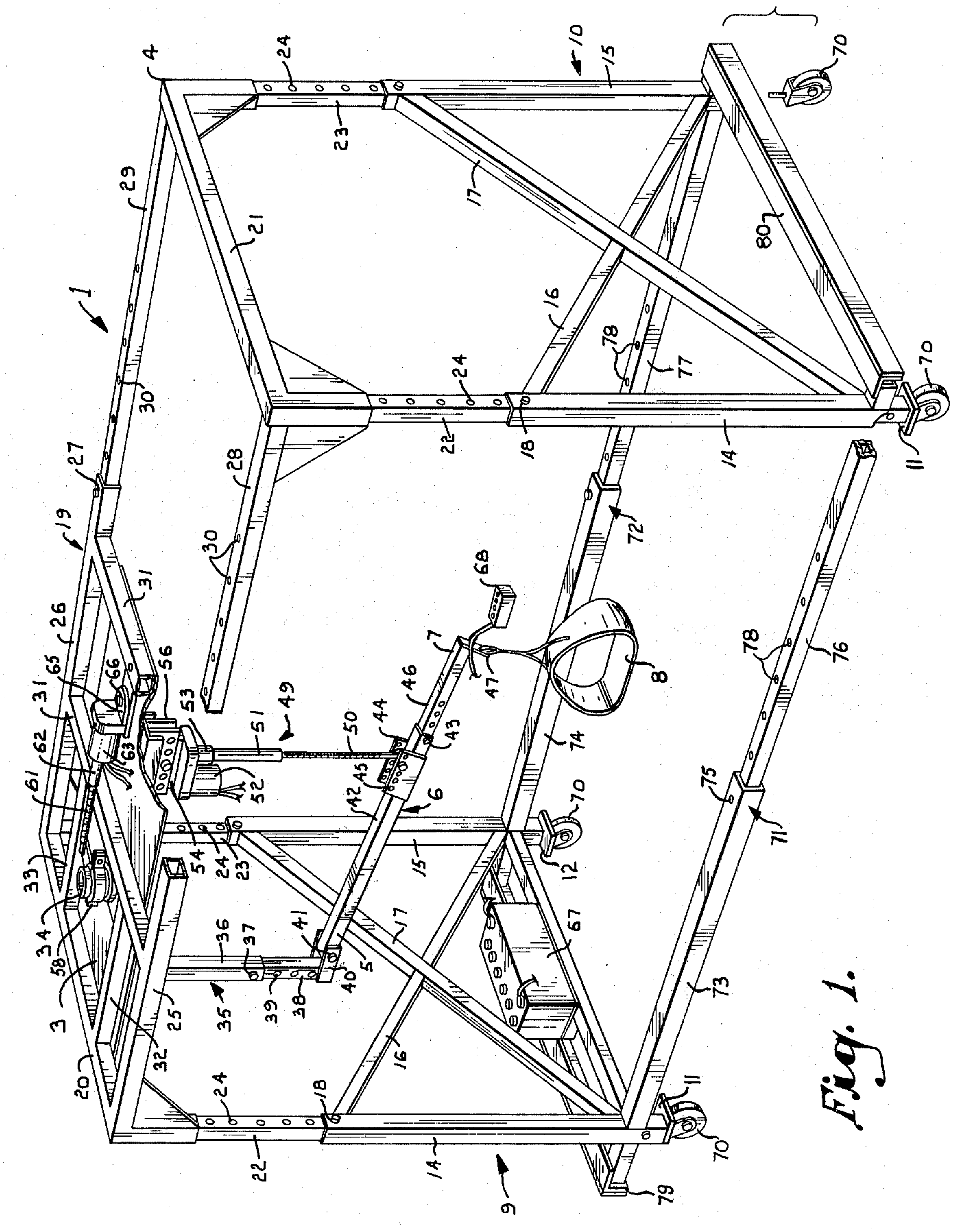
FIG. 1 is a perspective view of a hoist and transporting apparatus embodying features of the present invention.
Figure 2:
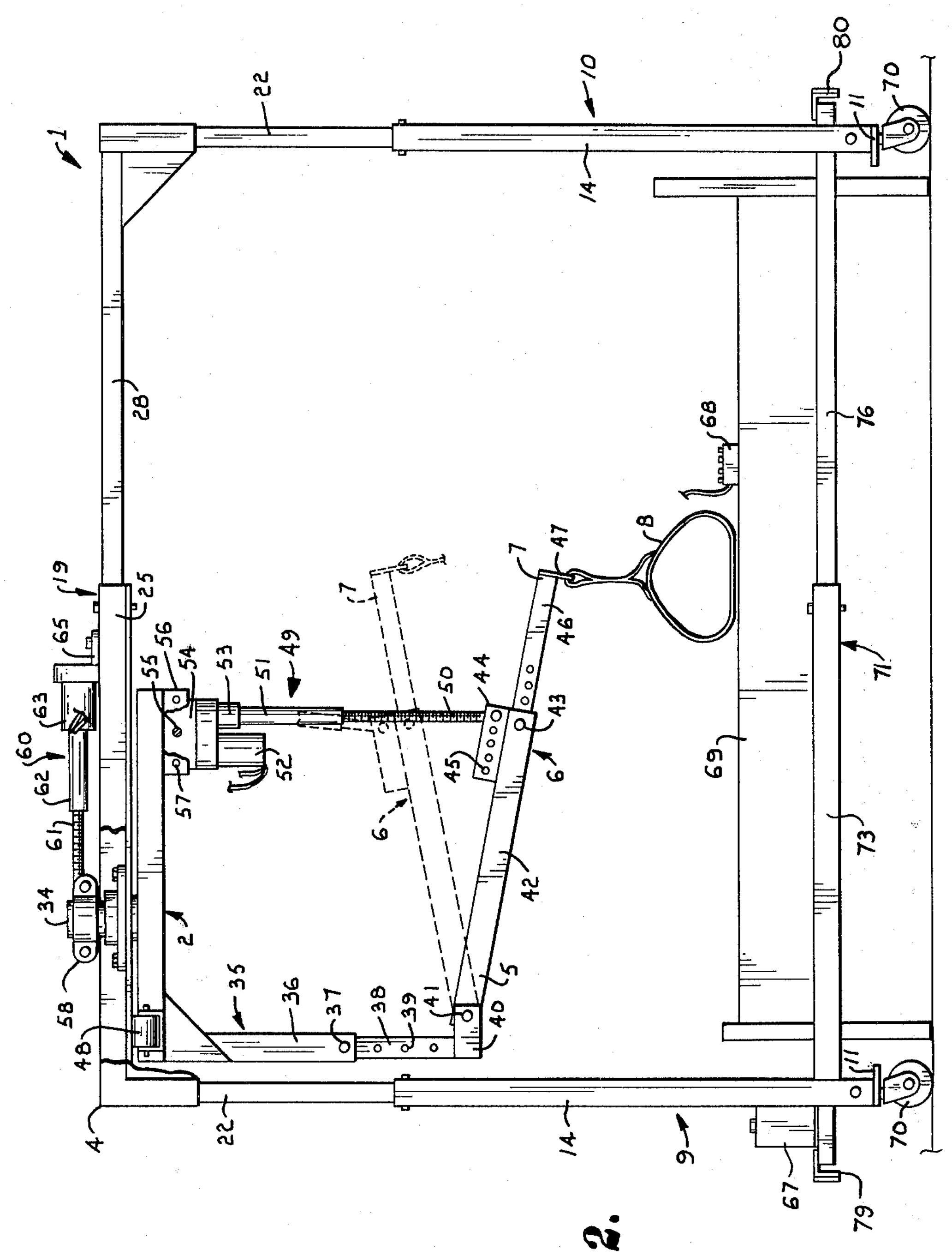
FIG. 2 is a side elevational view of the hoist and transporting apparatus with alternate positions thereof shown in broken lines.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

DETAILED DESCRIPTION

In the disclosed embodiment of the present invention, the reference numeral 1 designates generally a hoist and transporting apparatus for lifting and moving invalids, or disabled persons, such as paraplegics, polio victims, and the like. The hoist and transporting apparatus 1 includes a mounting member 2 rotatably mounted on and depending from a support deck 3 of a frame structure 4. The mounting member 2 has one end 5 of a boom 6 pivotally connected thereto and movable therewith. The other end 7 of the boom 6 has a harness member 8 thereon adapted to support a load, such as a person, and the other end 7 of the boom 6 is movable toward and away from the mounting member 2 to raise and lower the load.

The frame structure 4 may be any suitable support structure adapted to be positioned in areas of desired use, such as in bedrooms, bathroom and the like and in the illustrated structure, the frame structure includes a pair of opposed generally vertical end frames 9 and 10 each having a pair of laterally spaced support feet 11 and 12 to define a base for the end frames 9 and 10. The feet 11 and 12 are illustrated as planar members adapted to be positioned on a floor or like support surface and are adapted to have respective legs of a bed supported thereon. The end frames 9 and 10 each have tubular leg portions 14 and 15 suitably mounted on the feet 11 and 12 respectively and extending upwardly therefrom. In the illustrated structure, the leg portions 14 and 15 are sleeved on upstanding projections of the feet 11 and 12 respectively.

Each end frame 9 and 10 includes suitable bracing members 16 and 17 extending between and having opposite ends thereof suitably secured to the leg portion 14 and 15, as by welding. In the illustrated structure, the bracing members 16 and 17 are arranged to form cross or X-bracing. Each of the leg portions 14 and 15 have at least one aperture 18 in an upper end portion thereof, for a purpose later described.

The frame structure 4 includes a generally horizontal top frame 19 extending between and suitably connected to the end frames 9 and 10. The top frame 19 has the support deck 3 mounted thereon. The top frame 19 includes end members 20 and 21 each having depending leg portions 22 and 23 adapted to be received in the leg portions 14 and 15 of the respective end frames 9 and 10. The leg portions 22 and 23 each have a plurality of longitudinally spaced apertures 24 which are each selectively alignable with the aperture 18 in the respective leg portions 14 and 15. A suitable fastening member, such as a pin or bolt, is received in the aperture 18 and in the selected one of the apertures 24 whereby the position of the top frame 19 is vertically adjustable particularly to adapt the structures for use with beds or other devices of different heights.

One of the end members of the top frame 19, for example end member 20, has a pair of laterally spaced tubular side members 25 and 26 extending from opposite end portions thereof. The free end portions of the side members 25 and 26 each have at least one aperture 27 therein, for a purpose later described.

The other end member 21 has a second pair of laterally spaced side members 28 and 29 extending from opposite end portions thereof. The free end portions of the side members 28 and 29 are adapted to be received in the side members 25 and 26 respectively. The side members 28 and 29 each have a plurality of longitudinally spaced apertures 30 each selectively alignable with the aperture 27 in the respective side members 25 and 26. A suitable fastening member, such as a pin or bolt, is received in the aperture 27 and in a selected one of the apertures 20 whereby the spacing between the end frames 9 and 10 is longitudinally adjustable to adapt the structure for use with beds and the like of different lengths.

The side members 25 and 26 extending from the one end member 20 have a plurality of bracing members 31 extending therebetween and suitably secured thereto to define a rigid structure. In the illustrated structure, the bracing members 31 each are substantially parallel with the one end member 20 of the top frame 19. The support deck 3 is mounted on the end member 20 and the bracing member 31. Side edge members 32 and 33 are suitable secured to respective side edges of the support deck 3 and are spaced from and substantially parallel with the side members 25 and 26 respectively to thereby define a rigid deck supporting structure.

The mounting member 2 may be any suitable elongated structural member, such as a channel, wide flange beam, I-beam, or the like, and has a generally cylindrical axle portion 34 extending upwardly from an intermediate portion thereof and through a suitable aperture in the support deck 3. The aperture in the support deck 3 is provided with a suitable bearing therein and positioned to be in engagement with the axle portion 34 which is suitably rotatably supported on the support deck 3 and extends upwardly therefrom, for a purpose later described.

An arm or vertical member 25 depends from a first end of the mounting member 2. In the illustrated structure, the arm 35 has a first tubular arm portion 36 with the upper end thereof suitably secured to the first end of the mounting member 2, as by welding. A lower end of the first arm portion 36 has at least one aperture 37 therein, for a purpose later described. The arm 35 includes a second arm portion 38 having an upper end portion thereof adapted to be received in the lower end of the first arm portion 36. The second arm portion 38 has a plurality of longitudinally spaced apertures 39 in the upper end portion thereof each selectively alignable with the aperture 37 in the first arm portion 36. A suitable fastening member, such as a bolt or pin, is received in the aperture 37 and in a selected one of the apertures 39 whereby the spacing between the one end 5 of the boom 6 and the mounting member 2 is adjustable vertically. A suitable bracket 40 is mounted on the lower end of the second arm portion 38 and has an aperture 41 therein for pivotally supporting the one end 5 of the boom 6.

The illustrated boom 6 has a first boom portion 42 which is tubular and has the one end 5 thereof pivotally mounted on the bracket 40 on the lower end portion of the second or lower portion 38 of the arm 35. The other end portion of the first boom portion 42 has at least one aperture 43 therein, for a purpose later described. A bracket 44 is mounted on the other or free end portion of the first boom portion 42 and is positioned adjacent the aperture 43. The bracket 44 has a plurality of longitudinally spaced apertures 45, for a purpose later described.

The boom 6 includes a second boom portion 46 having one end portion thereof received in the other end portion of the first boom portion 42 and an eye portion 47 or other suitable support for the harness member 8 is mounted on the other end 7 of the second boom portion 46.

It is desirable to maintain the mounting member 2 substantially horizontal when a load is applied on the other end 7 of the boom 6. Therefore, suitable rollers 48 are mounted on the upper surface of the first end of the mounting member 2 and are positioned to engage a lower surface of the support deck 3.

Extensible means 49 extend between and have opposite end portions thereof pivotally connected to the second or other end of the mounting member 2 and an intermediate portion of the boom 6. The extensible means 49 is operative to selectively move the other end 7 of the boom 6 toward and away from mounting member 6 to thereby raise and lower a load.

In the illustrated structure, a rod 50 has one end thereof pivotally connected to the intermediate portion of the boom 6, as by being pivotally connected to the bracket 44. A bolt or pin is received in a selected one of the plurality of apertures 45 and in an aperture in the end of the rod 50. The other end of the rod 50 is threaded and received in an internally threaded sleeve 51. Means are pivotally mounted on the second end of the elongated mounting member 2 and are operatively connected to the internally threaded sleeve 51 for selectively rotating same to effect movement of the rod 50 longitudinally of the sleeve 51.

The illustrated extensible means 49 includes a drive motor 52 operatively connected to the sleeve 51 and having a tubular guide 53 for the sleeve 51. The drive motor 52 has a rib 54 connected thereto and to the guide 53. The rib 54 has an aperture 55 therein, for a purpose later described. A bracket 56 is mounted on the second or other end portion of the mounting member 2 and the bracket 56 has a plurality of apertures 57 each selectively alignable with the aperture 55 in the rib 54. The aperture 55 and a selected one of the apertures 57 receive a suitable bolt or pin to pivotally mount the motor 52 and the guide 53 on the second end of the mounting member 2.

Means are provided for turning the mounting member 2 relative to the support deck 3 and thereby turning the boom 6 relative to the frame structure 4. In the illustrated structure, a bracket 58 is mounted on the axle portion 34 adjacent an upper end thereof. The bracket 58 extends outwardly from the axle portion 34 and the bracket 58 has a plurality of spaced apertures 59 therein, for a purpose later described.

Extensible means 60 extend between and have opposite end portions thereof pivotally connected to the bracket 58 and to the support deck 3. The extensible 60 is operative to turn the first end of the mounting member 2 relative to the support deck 3 and thereby move the other end 7 of the boom 6 and the harness member 8 thereon.

In the illustrated structure, a rod 61 has one end thereof pivotally connected to a selected one of the apertures 59 in the bracket 58 by a suitable bolt or pin. The other end portion of the rod 61 is threaded and received in an internally threaded sleeve 62. Means are pivotally mounted on the support deck 3 and are operatively connected to the internally threaded sleeve 62 for selectively rotating same to effect movement of the rod 61 longitudinally of the sleeve 62. The illustrated drive motor 63 is operatively connected to the sleeve 62 and has a tubular guide 64 for the sleeve 62. The drive motor 63 has a rib 65 connected thereto and to the guide 64. The rib 65 has an aperture 66 therein adapted to receive a suitable pin or bolt extending through the support deck 3 to pivotally mount the drive motor 63 and the guide 64 on the support deck 3.

A suitable electric storage battery 67 is mounted on the frame structure 4 and is operative to provide an alternate source of electrical power for the motors 52 and 63. Suitable control means including a control unit 68 is electrically connected to the battery 67 and to the drive motors 52 and 63 for the extensible means 49 and 60 respectively and operative to selectively move the other end 7 of the boom 6 and selectively turn the mounting member 2 relative to the support deck 3. The control unit 68 preferably has a plurality of push buttons for controlling forward and reverse rotation of the sleeves 51 and 62 which effect movement of the rods 50 and 61 as desired.

In using a hoist and transporting apparatus constructed as illustrated and described for moving a person from a bed 69 to an other location, such as a wheel chair, or the like, the harness member 8 is fitted on the person and connected to the other end 7 of the boom 6. The push buttons on the control unit 68 are engaged to raise the person and then stop the motor 52. The respective push buttons on the control unit 68 are depressed to rotate the mounting member 2 and thereby move the other end 7 of the boom 6 outwardly from the bed 69. The control unit 68 is operative to stop the drive motor 63 when the person is safely seated in the chair or other structure.

When it is desirable that the hoist and transporting apparatus 1 be portable, suitable wheels 70 are mounted on the support feet 11 and 12 of each of the end frames 9 and 10. Caster-type wheels are preferred for easy maneuverability. The spindle portion of the caster type wheels are removably received in the upstanding projections of the feet 11 and 12.

The frame structure 4 is preferably a rigid structure and it is desirable that the spacing between the end frames 9 and 10 adjacent the wheels 70 be maintained during moving and when in use, therefore, the braces 71 and 72 extend between the end frames 9 and 10 and are positioned at opposite sides thereof.

The tie braces 71 and 72 include first tubular side members 73 and 74 having one end thereof connected to the leg portions 14 and 15 of the one end frame 9 in any suitable manner. The first side members 73 and 74 each have at least one aperture 75 in the free end thereof.

The tie braces 71 and 72 include second tubular side members 76 and 77 having one end thereof connected to the leg portions 14 and 15 of the other end frame 10 in any suitable manner. The second side members 76 and 77 are adapted to be received in the first side members 73 and 74 respectively. The second side members 76 and 77 each have a plurality of longitudinally spaced aperture 78 which are each selectively alignable with the aperture 75 in the respective first side members 73 and 74. A suitable fastening member, such as a pin or bolt, is received in each aperture 75 and in the selected one of the apertures 78 whereby the spacing between the end frames 9 and 10 adjacent the wheels 70 is longitudinally adjustable to conform to the adjusted length of the top frame 19.

It is also desirable to provide suitable bumper members 79 and 80 on the end frames 9 and 10 particularly when the hoist and transporting apparatus 1 is to be portable. The bumper members 79 and 80 each extend between and are mounted on the leg portions 14 and 15 of the end frames 9 and 10 respectively.

It is to be understood that while I have illustrated and described certain forms of my invention, it is not to be limited to these specific forms or arrangement of parts herein described and shown.

What I claim and desire to secure by Letters Patent is:

1. A hoist and transporting apparatus for moving disabled persons as between a bed and chair comprising:

a. a frame structure having a support deck in an elevated position for use over a disabled person support, said frame structure including a plurality of generally upright legs operatively supporting said support deck;
b. a mounting member in depending relation to said support deck and rotatably carried thereby for rotation about a vertical axis, said mounting member having an elongate arm depending therefrom in spaced relation to said vertical axis, said arm having a lower end spaced below the mounting member and above a person to be moved;
c. an elongate boom having one end portion pivotally mounted on said arm adjacent the lower end thereof for up and down movement, said boom extending from said arm beyond said vertical axis and having a free end portion movable to a position generally over a person to be moved;
d. means connected to said boom free end portion and having a body support member for receiving a person;
e. powered means operatively connected to said mounting member and said boom in spaced relation to the pivoted end thereof for selectively moving said boom to raise and lower a person received by the body supporting member; and
f. powered means operatively connected to said frame structure and said mounting member for selectively rotating said mounting member relative to said support deck and move the boom and the body supporting member about said vertical axis.

2. A hoist and transporting apparatus as set forth in claim 1 wherein:

a. said mounting member comprises an elongated member having an intermediate portion thereof rotatably mounted on said support deck;
b. said arm depends from a first end of said elongated member; and
c. said powered means for moving said boom up and down includes extensible means extending between a second end of said elongated member and an intermediate portion of said boom.

3. A hoist and transporting apparatus as set forth in claim 2 wherein said extensible means extending between said mounting member and the intermediate portion of said boom comprises:

a. a rod having one end thereof pivotally connected to the intermediate portion of said boom, said rod being threaded from the other end thereof;
b. an internally threaded sleeve adapted to receive the threaded other end of said rod therein; and
c. said powered means including a drive structure pivotally mounted on the second end of said elongated mounting member and operatively connected to said internally threaded sleeve for selectively rotating same to effect movement of said rod longitudinally of said sleeve.

4. A hoist and transporting apparatus as set forth in claim 3 wherein said powered means for turning said mounting member relative to said support deck comprises:

a. a rod having one end thereof pivotally connected to the intermediate portion of said elongated mounting member in outwardly spaced relation to said vertical axis, said rod being threaded from the other end thereof;

b. an internally threaded sleeve adapted to receive the threaded other end of said rod therein; and c. drive means pivotally mounted on said support deck and operatively connected to said internally threaded sleeve for selectively rotating same to effect movement of said rod longitudinally of said sleeve.

5. A hoist and transporting apparatus as set forth in claim 4 including:

a. an electrical storage battery mounted on said frame; and b. control means electrically connected to said battery and to said drive means for said extensible means extending between said mounting member and the intermediate portion of said boom and electrically connected to said drive means for said extensible means extending between said support deck and the intermediate portion of said mounting member for selectively moving the other end of said boom and selectively turning said mounting member relative to said support deck.

6. A hoist and transporting apparatus as set forth in claim 4 wherein:

a. said frame structure has a pair of opposed generally vertical end frames each having a pair of said generally upright legs, said legs being laterally spaced and adjustable in length to vary the height of the support deck;

b. said frame structure includes a generally horizontal top frame extending between and connected to said end frames and having said support deck mounted thereon; and c. said top frame has a pair of laterally spaced side members adjustable in length to vary the spacing between the end frames.

7. A hoist and transporting apparatus as set forth in claim 6 wherein:

a. said frame structure includes a pair of lower side members extending between and connecting lower portions of legs of the end frames, said lower side members being adjustable in length to correspond to adjustment of the side members of the top frame;

b. said arm depending from said mounting member being adjustable in length to vary the height of the boom;

c. said boom being adjustable in length to vary the position of the body support member; and d. said adjustable length side members, arm and boom permitting the frame to be positioned and the boom operated to move persons to and from beds of different sizes and heights.

8. A hoist and transporting apparatus as set forth in claim 7 wherein:

a. said elongated mounting member is normally generally lengthwise of the frame and the arm depending from said first end is adjacent an end frame with the boom extending therefrom over a bed positioned within the frame structure; and b. said boom is of a length that when the mounting member is rotated the body support member is swung to a side and spaced outwardly fromsaid bed.

9. A hoist and transporting apparatus as set forth in claim 8 and including:

a. an electrical storage battery mounted on said frame;

b. control means electrically connected to said battery and to said drive means for said extensible means extending between said mounting member and the intermediate portion of said boom and electrically connected to said drive means for said extensible means extending between said support deck and the intermediate portion of said mounting member for selectively moving the other end of said boom and selectively turning said mounting member relative to said support deck, said control means including a switch unit positioned adjacent the body support member for actuation by a person therein for self control of the movements of the boom and positioning of said body support member; and c. wheel means on lower ends of each of said frame legs whereby the apparatus is bodily movable for selectively positioning same relative to a bed and the like.

* * * * *